US008544830B2

(12) United States Patent
Sladojevic

(10) Patent No.: US 8,544,830 B2

(45) Date of Patent: Oct. 1, 2013

(54) MAGNETIC CLAMP

(75) Inventor: Robert Sladojevic, Blackwood (AU)

(73) Assignee: SRB Construction Technologies Pty Ltd, Blackwood (AU)

( * ) Notice: Subject to any disclaimer, the term of this patent is extended or adjusted under 35 U.S.C. 154(b) by 623 days.

(21) Appl. No.: 12/311,103

(22) PCT Filed: Sep. 4, 2007

(86) PCT No.: PCT/AU2007/001292

§ 371 (c)(1), (2), (4) Date: Mar. 29, 2010

(87) PCT Pub. No.: WO2008/034166

PCT Pub. Date: Mar. 27, 2008

(65) Prior Publication Data

US 2010/0213657 A1 Aug. 26, 2010

(30) Foreign Application Priority Data

Sep. 18, 2006 (AU) ................................ 2006905147

(51) Int. Cl.
*B25B 11/00* (2006.01)
*B29C 33/22* (2006.01)
*B60L 1/02* (2006.01)

(52) U.S. Cl.
USPC ............... 269/8; 294/65.5; 249/139; 219/205

(58) Field of Classification Search
USPC ................. 269/8; 294/65.5; 249/139, 187.1, 249/163; 219/205, 733
See application file for complete search history.

(56) References Cited

U.S. PATENT DOCUMENTS

| | | | | |
|---|---|---|---|---|
| 2,502,672 | A | 4/1950 | Royther | |
| 2,709,292 | A | 5/1955 | Otti | |
| 2,946,360 | A | 7/1960 | Solo | |
| 2,954,257 | A | 9/1960 | Besuch | |
| 3,014,751 | A * | 12/1961 | Smith | 294/65.5 |
| 3,319,989 | A * | 5/1967 | Ross | 294/65.5 |
| RE26,710 | E | 11/1969 | Barnes | |
| 3,507,473 | A | 4/1970 | Blonde | |
| 3,648,961 | A | 3/1972 | Farrow | |
| 3,917,216 | A | 11/1975 | Plough | |
| 3,926,404 | A | 12/1975 | Lovisa et al. | |
| 4,159,097 | A | 6/1979 | Strickland | |
| 4,634,359 | A | 1/1987 | Sartorio | |
| 4,726,560 | A | 2/1988 | Dotson | |
| 5,066,936 | A * | 11/1991 | Hsu | 335/295 |

(Continued)

FOREIGN PATENT DOCUMENTS

| | | | |
|---|---|---|---|
| DE | 202 654 | A1 | 9/1983 |
| DE | 297 02 835 | U1 | 6/1998 |

(Continued)

*Primary Examiner* — Lee D Wilson
*Assistant Examiner* — Alvin Grant
(74) *Attorney, Agent, or Firm* — Seed IP Law Group PLLC

(57) ABSTRACT

A magnetic clamp has a housing, the housing defining a base for resting on a work surface. An adjustable friction reducing arrangement is associated with the base of the housing. The friction reducing arrangement is movable relative to the base between a first position in which the friction reducing arrangement reduces an area of contact between the base of the housing and the work surface and a second position in which the area of contact between the base of the housing and the work surface is increased.

16 Claims, 4 Drawing Sheets

(56) References Cited

U.S. PATENT DOCUMENTS

| | | | | |
|---|---|---|---|---|
| 5,146,816 | A | 9/1992 | Badstieber | |
| 5,282,603 | A | 2/1994 | Taraldsson | |
| 5,993,365 | A * | 11/1999 | Stagnitto et al. | 483/59 |
| 6,202,978 | B1 * | 3/2001 | Vappula | 249/187.1 |
| 6,276,657 | B1 * | 8/2001 | Vappula | 249/163 |
| 6,434,894 | B2 * | 8/2002 | Reymann | 52/127.7 |
| 6,471,273 | B1 * | 10/2002 | Friedrich et al. | 294/65.5 |
| 6,477,816 | B1 | 11/2002 | Di Biase | |
| 6,547,209 | B1 * | 4/2003 | Vappula | 249/139 |
| 6,733,059 | B2 | 5/2004 | Flathau | |
| 6,742,759 | B2 | 6/2004 | Vappula | |
| 6,837,473 | B2 | 1/2005 | Petkau | |
| 6,854,777 | B2 * | 2/2005 | Jung | 294/65.5 |
| 6,969,056 | B2 | 11/2005 | Sato et al. | |
| 7,419,131 | B2 * | 9/2008 | Von Limburg | 249/139 |
| 7,548,147 | B2 * | 6/2009 | Chiang | 335/285 |
| 7,850,142 | B2 * | 12/2010 | Sladojevic et al. | 249/219.1 |
| 7,887,022 | B2 * | 2/2011 | Von Limburg et al. | 249/139 |
| 8,002,234 | B2 | 8/2011 | Rodin | |
| 8,292,242 | B2 | 10/2012 | Thompson | |
| 8,322,699 | B2 | 12/2012 | Prell et al. | |
| 2005/0116131 | A1 * | 6/2005 | Samuel | 248/357 |
| 2005/0258319 | A1 | 11/2005 | Jeong | |
| 2007/0131829 | A1 | 6/2007 | Thompson | |

FOREIGN PATENT DOCUMENTS

| | | | |
|---|---|---|---|
| EP | 0 945 238 | B1 | 9/1999 |
| EP | 1 810 806 | A2 | 7/2007 |
| JP | 04313593 | A * | 11/1992 |
| WO | 0211951 | A1 | 2/2002 |

* cited by examiner

MAGNETIC CLAMP

BACKGROUND

1. Technical Field

This disclosure relates, generally, to the clamping of elements during the fabrication of concrete slabs. More particularly, the disclosure relates to a magnetic clamp.

2. Description of the Related Art

Manufacture of concrete slabs and structures is now commonly effected by pre-casting techniques. Pre-cast manufacture of concrete panels and structures is becoming the preferred method for many construction applications including industrial, commercial and retail applications.

Typically, pre-casting of a concrete panel or other concrete member is performed on a steel bed. Edge or perimeter molds are used to produce concrete slabs and structures of a certain shape. These molds are commonly referred to as sideforms. Magnetic clamps, to which the sideforms are attached, are used to secure the sideforms in position on a steel bed.

The magnetic clamp exerts an extremely large clamping force to secure the magnetic clamp in position on the steel bed and to inhibit movement of the sideform relative to the steel bed. Due to the magnitude of the clamping force, the magnetic clamp usually has a means for controlling the magnetic attraction between the magnetic clamp and the steel bed. Once the clamping force exceeds a predetermined magnitude, it becomes difficult to adjust the position of the magnetic clamp relative to the steel bed.

Furthermore, a magnetic clamp is quite heavy which also increases the difficulty of adjusting the position of the magnetic clamp relative to the steel bed.

BRIEF SUMMARY

According to one embodiment of the invention, there is provided a magnetic clamp which comprises:

a housing, the housing defining a base for resting on a work surface; and an adjustable friction reducing arrangement associated with the base of the housing, the friction reducing arrangement being movable relative to the base between a first position in which the friction reducing arrangement reduces an area of contact between the base of the housing and the work surface and a second position in which the area of contact between the base of the housing and the work surface is increased.

A magnet may be housed in the housing. The magnet may be displaceably arranged within the housing. The clamp may include an operating member arranged on the housing for displacing the magnet relative to the housing between an active state in which the magnet exerts a clamping force for clamping the housing to the work surface and an inactive state in which the magnet exerts a residual force smaller than the clamping force.

The friction reducing arrangement may comprise a plurality of friction reducing elements. Each friction reducing element may be a retractable element. In one preferred embodiment, each friction reducing element is a retractable pin carried by the base, the pin being movable relative to the base between a normally extended position and a retracted position. The area of contact between the housing and the work surface may be reduced when each friction reducing element is in its extended position and, conversely, the area of contact between the housing and the work surface may be maximized when each friction reducing element is in its retracted position.

Each friction reducing element may define a foot which rests on the work surface when the friction reducing element is in its extended position so that at least a part of the base of the housing is elevated above the work surface.

Further, each friction reducing element may be displaceably received in a receiving formation defined in the base of the housing. Each receiving formation may be arranged adjacent to a periphery of the base.

When each friction reducing element is in its retracted position, the foot of the friction reducing element may be received in its associated receiving formation to be substantially flush with a surface of the base.

An urging means may be associated with each friction reducing element to urge the friction reducing element to its extended position. Each urging means may be in the form of a spring, and more particularly, a coil spring co-axially aligned with its associated friction reducing element.

BRIEF DESCRIPTION OF THE SEVERAL VIEWS OF THE DRAWINGS

An embodiment of the invention is now described with reference to the accompanying drawings, in which.

DETAILED DESCRIPTION

Throughout this specification the word “comprise”, or variations such as “comprises” or “comprising”, will be understood to imply the inclusion of a stated element, integer or step, or group of elements, integers or steps, but not the exclusion of any other element, integer or step, or group of elements, integers or steps.

Figure 4:
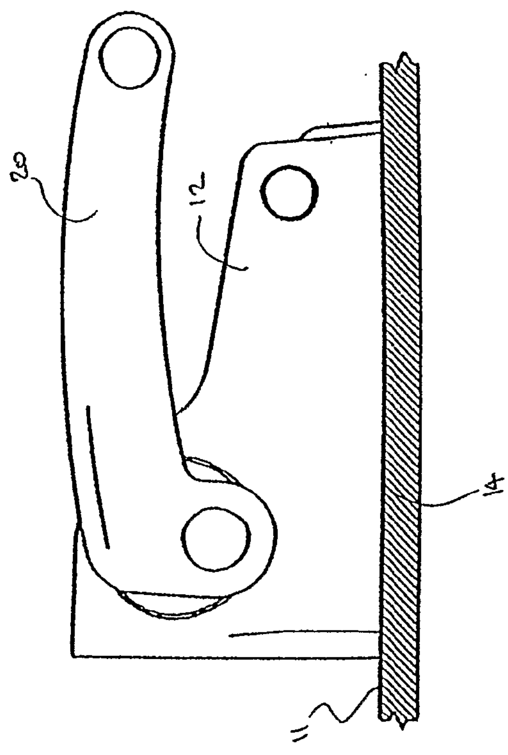
FIG. 4 shows a side view of the magnetic clamp on the work surface with the friction reducing arrangement in a retracted position.
Figure 3:
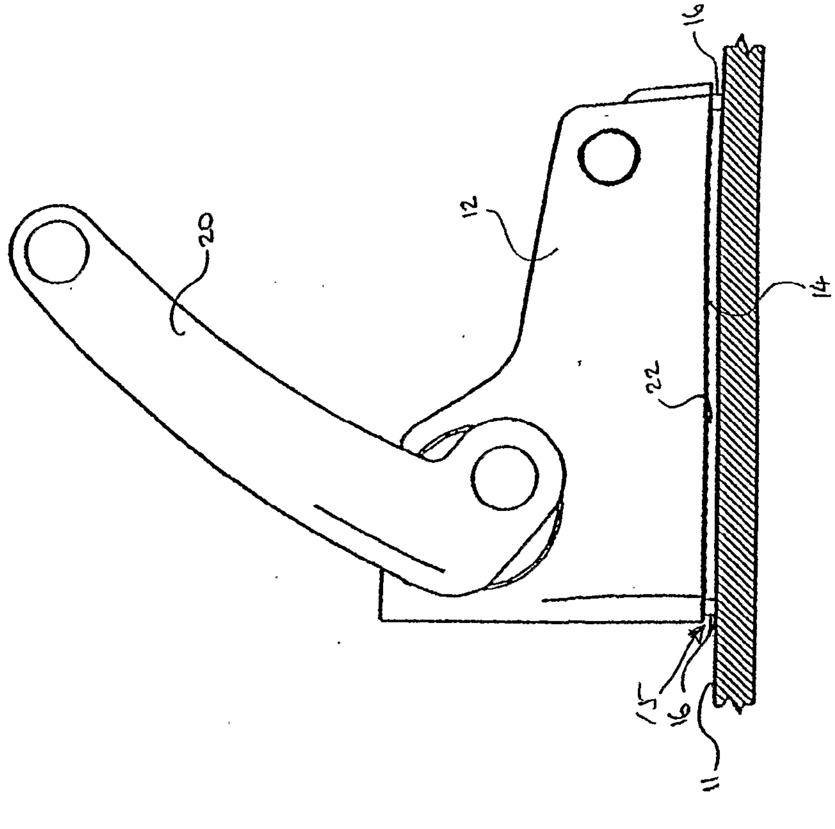
FIG. 3 shows a side view of the magnetic clamp on a work surface with a friction reducing arrangement in an extended position.

In the drawings, reference numeral 10 generally designates a magnetic clamp, in accordance with an embodiment of the invention, for clamping elements such as sideforms (not shown) to a work surface in the form of a steel bed 11 (FIGS. 3 and 4). The magnetic clamp 10 includes a housing 12 which defines a base 14. The magnetic clamp 10 also includes an adjustable friction reducing arrangement 15 carried on the base 14 of the housing 12. The friction reducing arrangement 15 comprises a plurality of friction reducing elements, each in the form of a pin 16, arranged in the base 14.

In the illustrated embodiment, the friction reducing arrangement 15 includes four pins 16. However, it will be appreciated that any number of pins 16 may be employed. Each pin 16 is movable relative to the base 14 between a first, extended position (FIGS. 1, 2, 3 and 5) in which the pins 16 reduce an area of contact between the housing 12 and the steel bed 11 and a second, retracted position (FIG. 4) in which the area of contact between the housing 12 and the steel bed 11 is maximized.

Figure 1:
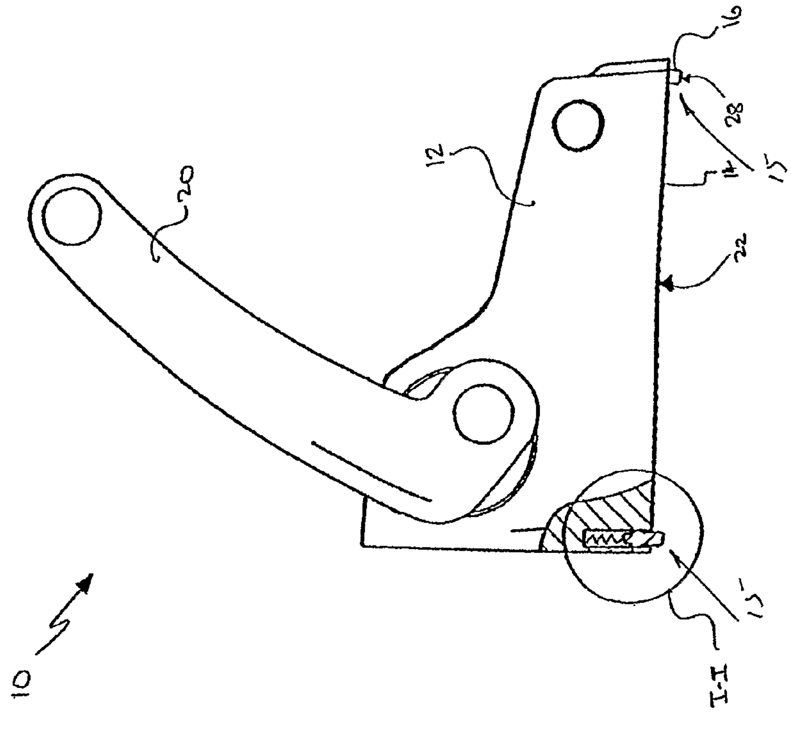
FIG. 1 shows, in partial cross-section, a side view of a magnetic clamp in accordance with an embodiment of the invention.
Figure 5:
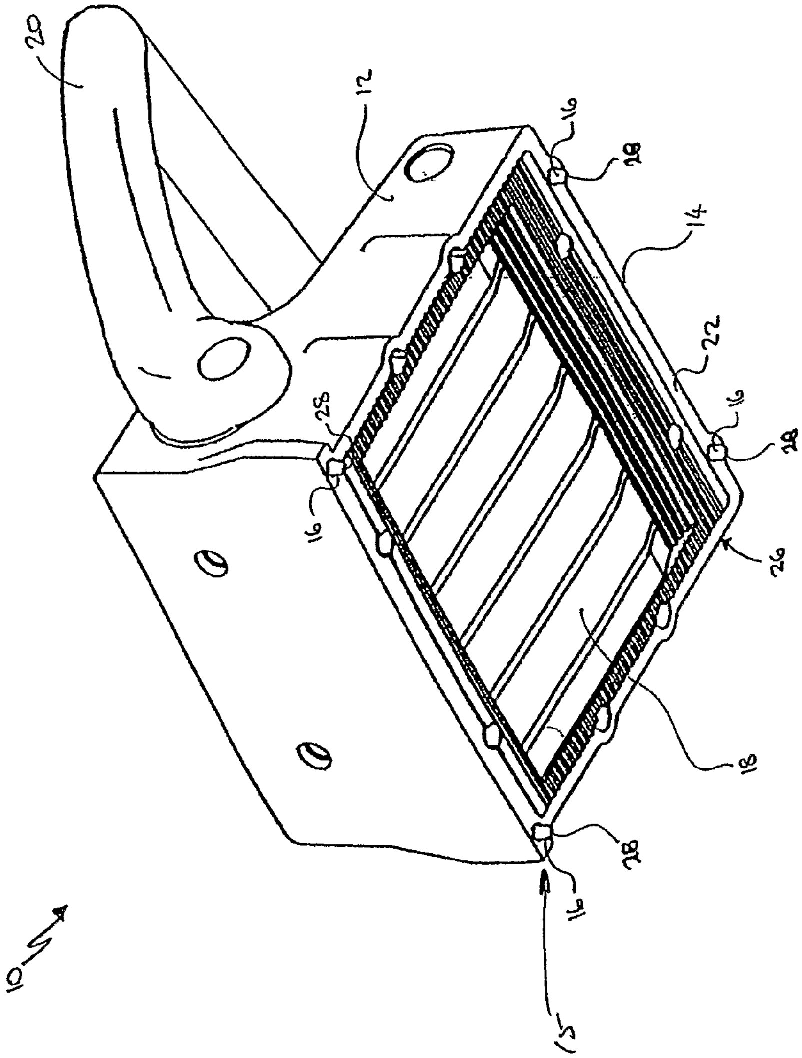
FIG. 5 shows a perspective view, from below, of the magnetic clamp.
Figure 6:
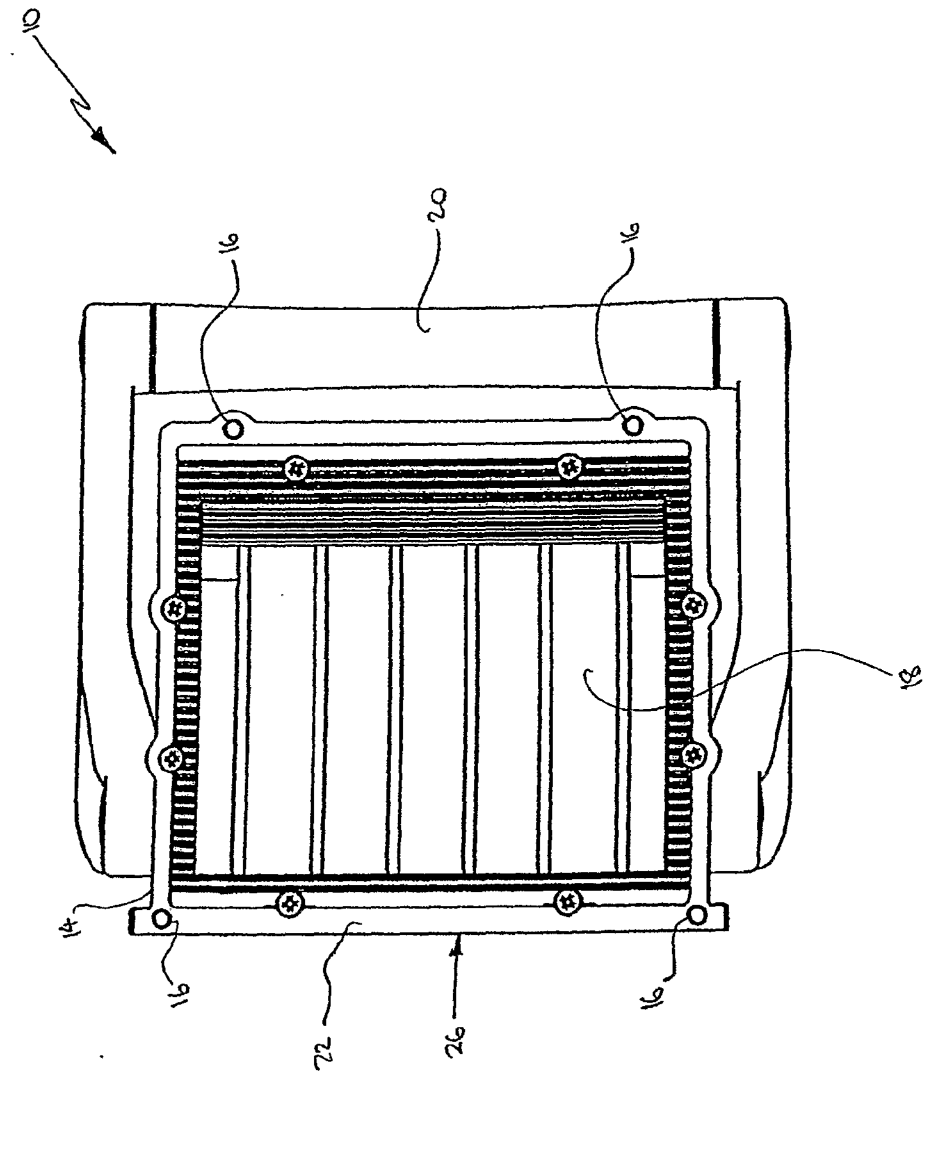
FIG. 6 shows a bottom view of the magnetic clamp.

The housing 12 houses a magnet 18 (FIGS. 5 and 6) for magnetically clamping the housing 12 to the steel bed 11. The housing 12 carries an operating handle 20 which acts on the magnet 18 such that movement of the handle 20 causes a corresponding movement of the magnet 18 inside the housing 12. Movement of the handle 20 to a first orientation (as shown in FIGS. 1, 3 and 5) causes retraction of the magnet 18 relative to the housing 12 so that the magnet 18 is in an inactive state. In its inactive state, the magnet 18 exerts a reduced, residual magnetic force on the steel bed 11 so that the assembly 10 can be positioned in a desired position on the steel bed 11. The magnitude of the residual magnetic force is such that, once the magnet 18 has been positioned on the steel bed 11, the magnetic force is sufficiently strong to maintain the housing 12 in the desired position on the steel bed 11.

When the handle 20 is moved to a second orientation (as shown in FIG. 4) the magnet 18 is moved to its operative, clamping position in which an operatively lower surface of the magnet 18 lies substantially flush with the base 14.

In this clamping position, the magnet 18 is able to exert a clamping force to clamp the housing 12 to the steel bed 11 securely.

Figure 2:
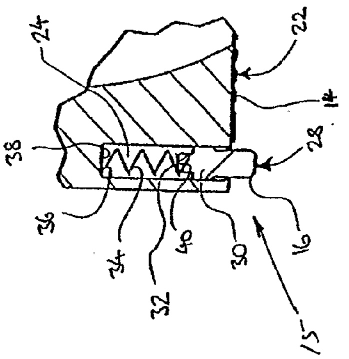
FIG. 2 shows an enlarged, cross-sectional view of detail I-I of FIG. 1.

The housing 12 defines an operatively lower surface 22 having a plurality of receiving formations, each of which is in the form of a bore 24 (FIG. 2). Each bore 24 slidably receives one of the pins 16 of the friction reducing arrangement 15. Each bore 24 is arranged adjacent a periphery 26 (FIGS. 5 and 6) of the lower surface 22 of the housing 12 and extends substantially perpendicularly to the lower surface 22 of the housing 12 into a wall of the housing 12.

Each pin 16 is a one-piece unit formed of a rigid material, such as a metal, and comprises a foot 28, a boss 30 and a spigot 32 (FIG. 2). Each pin 16 is slidably received in its associated bore 24 such that it can slide between its extended and retracted positions. Each boss 30 is sized to provide a snug sliding fit for the pin 16 in its associated bore 24. When the pin 16 is in its extended position, its associated foot 28 is proud of the lower surface 22 of the base 14. Conversely, when the pin 16 is in its retracted position, its associated foot 28 is substantially flush with the lower surface 22 of the housing 12.

An urging means in the form of a spring 34 is arranged in each bore 24. Each spring 34 has a first end 36 which abuts an end wall 38 of its associated bore 24 and a second end 40 which is mounted on the spigot 32 of its associated pin 16. Each spring 34 is arranged so that it is biased to urge its associated pin 16 to its extended position.

In use, the magnetic clamp 10 is used to clamp sideforms (not shown) to the steel bed 11, the sideforms being used to form a mold for casting a concrete panel. It will be appreciated by those skilled in the art that, in order to enhance the support for the sideforms which the magnetic clamp 10 provides, the magnetic clamp 10 is formed of materials which give rise to the clamp 10 having a substantial weight.

Due to the action of the springs 34 acting on the pins 16 to urge each pin 16 to its associated extended position in which the foot 28 of each pin 16 is proud of the lower surface 22 of the base 14, the housing 12 is supported on the pins 16 when the magnetic clamp 10 is initially placed on the work surface 11. Thus, the springs 34 have a sufficient spring force to overcome the weight of the clamp 10 at least when the magnet 18 is in its inactive state. The base 14 of the housing 12 is elevated above the steel bed 11. In addition, the combined spring force of the springs 34 is also sufficient to support the housing 12 against the action of the residual magnetic force exerted by the magnet 18 when the magnet 18 is in its inactive state.

Accordingly, with the pins 16 in their extended position, the area of contact with the steel bed 11 is determined by a surface area of the foot 28 of each of the pins 16. The combined surface area of the feet 28 is small relative to the surface area of the base 14 of the housing 12 and, as a consequence, reduces a resistance to maneuvering the housing 12 relative to the steel bed 11 to enable a user to position the clamp 10, carrying its associated sideform, in the desired position on the steel bed 11. In particular, minor adjustments to the position of the sideform relative to the steel bed 11 can be easily made when the pins 16 are in their extended position.

Once the sideform has been positioned, the user exerts a downward force on the housing 12 against the action of the springs 34 to urge the housing 12 towards the steel bed 11 until each pin 16 is received in its associated bore 24 and the base 14 of the housing 12 comes into contact with the steel bed 11. When this occurs, the residual magnetic force of the magnet 18 is sufficiently increased to hold the clamp 10 in position against the action of the springs 34.

The base 14 of the housing 12, together with the surface area of the foot 28 of each pin 16, forms an increased area of contact between the housing 12 and the steel bed 11. This increased area of contact results in a higher resistance to movement being generated between the housing 12 and the steel bed 11. Additional minor adjustments to the positioning of the sideform can now be made by tapping the housing 12.

Once the sideform is in its final desired position, the operating handle 20 is moved to its second orientation to displace the magnet 18 and bring it into its active state. In its active state, the magnet 18 exerts its clamping force which securely clamps the housing 12 and the sideform to the steel bed 11.

It is accordingly an advantage of a preferred embodiment of the invention to provide a magnetic clamp 10 which facilitates positioning of the clamp 10 on a work surface and allows minor positioning of the magnetic clamp 10 to be more easily effected such that more accurate manufacturing tolerances of the panels can be achieved.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A magnetic clamp, comprising:

a housing, the housing defining a base for resting on a work surface;

a friction reducing arrangement associated with the base of the housing, the friction reducing arrangement being movable relative to the base between a first position and a second position such that when the housing is on the work surface and the friction reducing arrangement is in the first position an area of contact between the base of the housing and the work surface is reduced relative to when the friction reducing arrangement is in the second position; and a magnet which is movably arranged relative to the housing, wherein the magnet is movably arranged relative to the housing between an inactive position and an active position to establish a magnetic force acting on the work surface during operation, the magnetic force being insufficient to overcome a bias of the friction reducing arrangement when the magnet is in the inactive position and the friction reducing arrangement is in the first position, and the magnetic force being sufficient to hold the magnetic clamp securely in position on the work surface when the magnet is in the active position and the friction reducing arrangement is in the second position.

2. The magnetic clamp of claim 1 wherein the magnet is housed in the housing.

3. The magnetic clamp of claim 2 wherein the magnet is displaceably arranged within the housing.

4. The magnetic clamp of claim 3 further comprising:

an operating member arranged on the housing for displacing the magnet relative to the housing between an active state in which the magnet exerts a clamping force for clamping the housing to the work surface and an inactive state in which the magnet exerts a residual force smaller than the clamping force.

5. The magnetic clamp of claim 1 wherein the friction reducing arrangement comprises a plurality of friction reducing elements.

6. The magnetic clamp of claim 5 wherein each friction reducing element is a retractable element.

7. The magnetic clamp of claim 6 wherein each friction reducing element is a retractable pin carried by the base, the pin being movable relative to the base between a normally extended position and a retracted position.

8. The magnetic clamp of claim 7 wherein each friction reducing element defines a foot, and wherein when each foot rests on the work surface and each friction reducing element is in an extended position at least a part of the base of the housing is elevated above the work surface.

9. The magnetic clamp of claim 5 wherein each friction reducing element is displaceably received in a receiving formation defined in the base of the housing.

10. The magnetic clamp of claim 5 wherein an urging means is associated with each friction reducing element to urge the friction reducing element to an extended position.

11. The magnetic clamp of claim 10 wherein each urging means is in the form of a spring aligned with an associated friction reducing element.

12. The magnetic clamp of claim 1 wherein the magnetic force is sufficient to hold the friction reducing arrangement in the second position while enabling minor adjustments of the magnetic clamp on the work surface when the magnet is in the inactive position and the friction reducing arrangement is in the second position.

13. A magnetic clamp, comprising:

a housing, the housing defining a base for resting on a work surface;

a friction reducing arrangement coupled to the housing, the friction reducing arrangement being movable relative to the base between a retracted position and an extended position; and a magnet which is arranged relative to the housing to move between an inactive position and an active position to establish a magnetic force acting on the work surface during operation, the magnetic force being insufficient to overcome a bias of the friction reducing arrangement when the magnet is in the inactive position and the friction reducing arrangement is in the extended position, and the magnetic force being sufficient to hold the magnetic clamp securely in position on the work surface when the magnet is in the active position and the friction reducing arrangement is in the refracted position.

14. The magnetic clamp of claim 13 wherein magnetic force is sufficient to hold the friction reducing arrangement in the retracted position while enabling minor adjustments of the magnetic clamp on the work surface when the magnet is in the inactive position and the friction reducing arrangement is in the retracted position.

15. A magnetic clamp, comprising:

a housing, the housing defining a base for resting on a work surface;

a friction reducing arrangement coupled to the housing, the friction reducing arrangement being movable relative to the base between a retracted position and an extended position such that when the housing is on the work surface and the friction reducing arrangement is in the extended position a frictional resistance to relative motion between the magnetic clamp and the work surface is reduced compared to when the friction reducing arrangement is in the retracted position; and a magnet which is arranged relative to the housing to move between an inactive position and an active position to establish a magnetic force acting on the work surface during operation, the magnetic force being insufficient to overcome a bias of the friction reducing arrangement when the magnet is in the inactive position and the friction reducing arrangement is in the extended position, and the magnetic force being sufficient to hold the magnetic clamp securely in position on the work surface when the magnet is in the active position and the friction reducing arrangement is in the refracted position.

16. The magnetic clamp of claim 15 wherein magnetic force is sufficient to hold the friction reducing arrangement in the retracted position while enabling minor adjustments of the magnetic clamp on the work surface when the magnet is in the inactive position and the friction reducing arrangement is in the retracted position.

* * * * *

UNITED STATES PATENT AND TRADEMARK OFFICE

CERTIFICATE OF CORRECTION

PATENT NO. : 8,544,830 B2
APPLICATION NO. : 12/311103
DATED : October 1, 2013
INVENTOR(S) : Saldojevic It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1103 days.

Signed and Sealed this
Tenth Day of March, 2015

Michelle K. Lee
*Deputy Director of the United States Patent and Trademark Office*